May 1, 1923.

H. CAPLAN

FENDER BRACKET

Filed Dec. 27, 1921

1,453,271

2 Sheets-Sheet 1

INVENTOR.
Harry Caplan
BY
Edward N. Pagelsen
ATTORNEY.

May 1, 1923.

H. CAPLAN

FENDER BRACKET

Filed Dec. 27, 1921

2 Sheets-Sheet 2

INVENTOR.

Harry Caplan

BY Edward N. Pagelsen

ATTORNEY.

Patented May 1, 1923.

1,453,271

UNITED STATES PATENT OFFICE.

HARRY CAPLAN, OF DETROIT, MICHIGAN.

FENDER BRACKET.

Application filed December 27, 1921. Serial No. 524,841.

*To all whom it may concern:*

Be it known that I, HARRY CAPLAN, a citizen of the Dominion of Canada, and residing at Detroit, in the county of Wayne and State of Michigan, have invented a new and Improved Fender Bracket, of which the following is a specification.

This invention relates to means for supporting fenders or bumpers at the ends of motor vehicles, and particularly to brackets adapted to be mounted on the rear frame member of a Ford automobile, and its object is to provide a construction of this character which will have great strength, which can be produced at comparatively low cost, and which can be attached in place without changing any of the parts of the automobile on which it is to be mounted.

This invention consists in the details of construction illustrated in the accompanying drawing and particularly pointed out in the claims.

Figure 1:
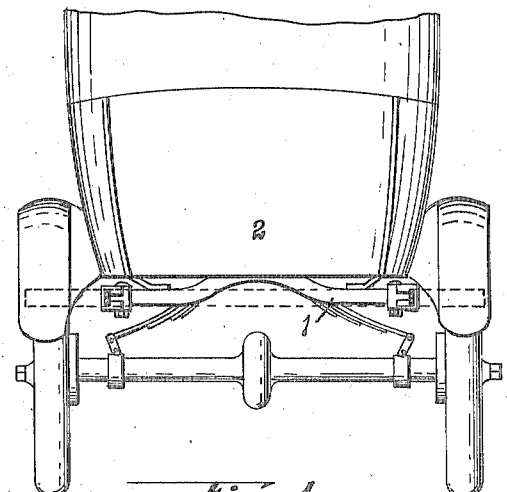
Figure 2:
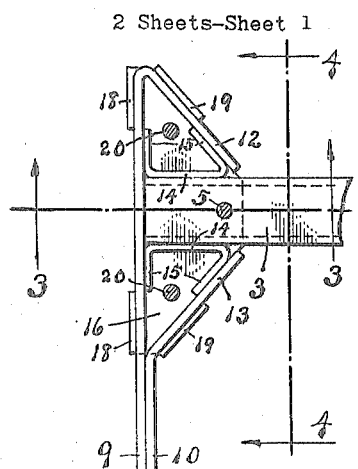
Figure 3:
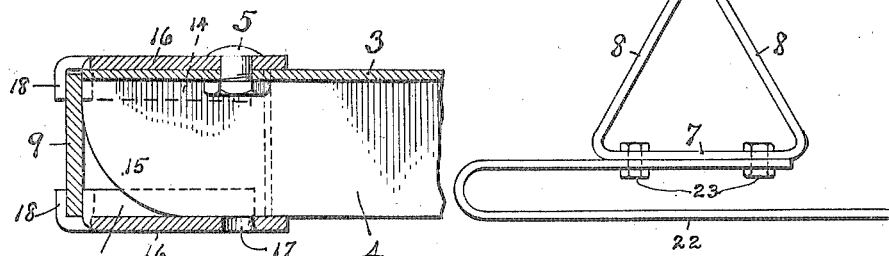
Figure 4:
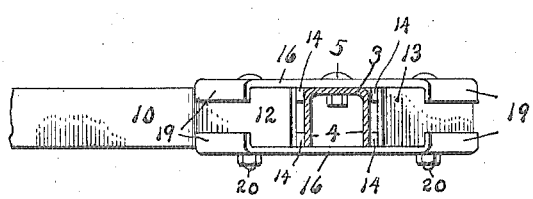
Figure 5:
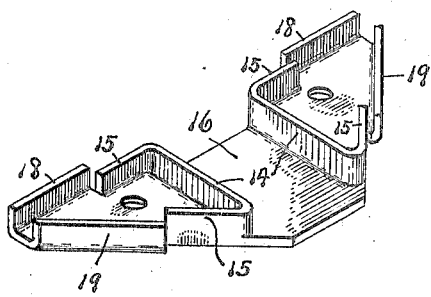
Figure 7:
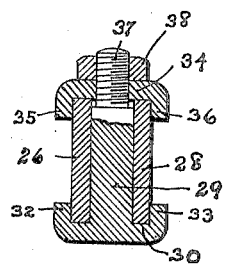
Figure 6:
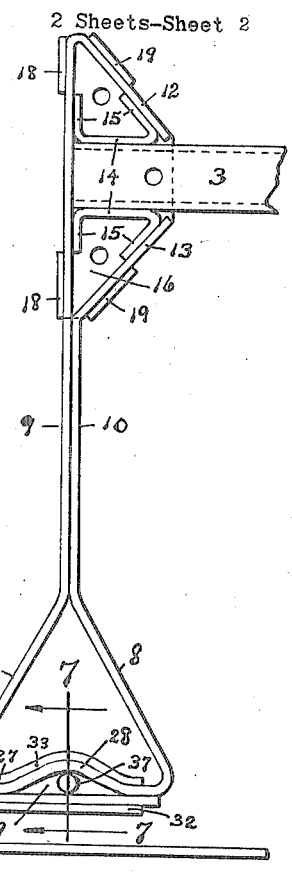
Figure 6:
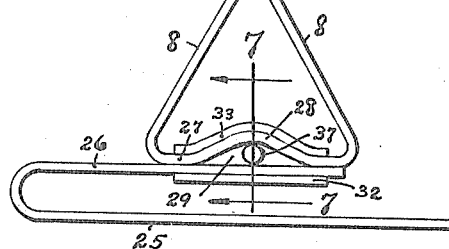
Figure 8:
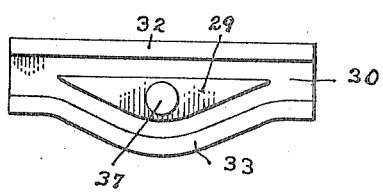

In the drawing, Fig. 1 is a rear view of an automobile with the inner ends of a pair of brackets shown attached to the rear cross bar of the vehicle. Fig. 2 is a plan of my improved bracket with one of the caps removed. Figs. 3 and 4 are sections on the lines 3—3 and 4—4 of Fig 2 with the bracket caps in position. Fig. 5 is a perspective of a cap plate. Fig. 6 is a plan of a modified form of bracket. Fig. 7 is a section on the line 7—7 of Fig. 6. Fig. 8 is a plan of a connecting bolt.

Similar reference characters refer to like parts throughout the several views.

The well known Ford automobile has a rear cross bar 1 just below the rear end of the body 2, and this bar is in the form of a channel with a horizontal web 3 and vertical flanges 4. The web is formed with holes near its ends which may receive the bolt 5 shown in Figs. 2, 3 and 4. The bracket is formed of a flat steel bar bent to constitute a triangular outer end having a cross piece 7 and sides 8, a central portion consisting of the two sides 9 and 10 and the inclined ends 12 and 13 which together constitute an open triangle which forms a part of the inner head of the bracket.

Two plates or caps 16 constitute portions of this head, and the upper may be formed with a hole 17 to receive the bolt 5. These caps have their edges turned in at 18 and 19 to fit against the side bar 9 and the ends 12 and 13. Attached to these plates are the braces 14 having ends 15, preferably formed by bending in parts of the edges of the plates and welding them to the braces 14. When the caps are mounted on the inner ends of the bracket and the head thus produced is mounted on the cross bar, these braces 14 engage the channel bar and the parts 15, 18 and 19 engage the bracket. Bolts 20 are adapted to hold the plates and the bracket united. The braces 14 may have any desired height, but should be spaced apart when the plates are attached to the bracket and frame bar.

The fender 22 may be of any desired size and form, that shown being attached to the bracket by means of bolts 23. Its construction, however, forms no part of the present invention.

Instead of the flat front end 7 of the bracket and the bolts 23, the construction shown in Figs. 6, 7 and 8 may be employed. The fender 25 has a turned-back portion at each end and the end 27 of the bracket has a curved central portion 28. A combined clamp and bolt to secure the fender to the bracket may have a central post 29 to extend between the fender and bracket, a base 30 to fit up against the fender and bracket, and flanges 32 and 33 to hold the fender and bracket against the central portion 29. A cap 34 has flanges 35 and 36 whose outline is similar to those of the base and the cap has a hole to receive the threaded stub 37. A nut 38 on this stud rigidly secures the parts together.

The other details and proportions of the fender bracket shown and described may all be changed without departing from the spirit of my invention as set forth in the following claims.

I claim:—

1. A fender bracket consisting of a straight intermediate portion, an outer end adapted to be attached to a fender, an inner triangular end adapted to be attached to the frame of a vehicle and having one side in the plane of said intermediate portion, and triangular caps adapted to be attached to said triangular end and to the frame of the vehicle.

2. A fender bracket consisting of two triangular ends and a bar between them, the outer end having a side at substantially right angles to the bar, which side is adapted to be attached to the fender, and caps attached to the inner end and to the frame bar of the vehicle.

3. A fender bracket consisting of two triangular ends and a bar between them, the outer end having a side at substantially right angles to the bar, which side is adapted to be attached to the fender, and caps attached to the inner end and to the frame bar of the vehicle, the edges of the caps being turned inwardly to brace the inner triangle.

4. A fender bracket consisting of two triangular ends and a bar between them, the outer end having a side at substantially right angles to the bar, which side is adapted to be attached to the fender, and caps attached to the inner end and to the frame bar of the vehicle, the edges of the caps being turned inwardly to brace the sides of the inner end, braces being attached to the inner sides of the caps to brace the inner end and position the bracket on the frame bar of the vehicle.

5. A fender bracket consisting of a flat bar bent to form a triangular outer end and a doubled portion extending therefrom, and having its ends extending at an angle toward each other, triangular caps attached to the opposed edges of the parts of the bar constituting the inner end, the outer side of the outer end being concave, a flat fender member lying against said outer side, a fastening device to secure the fender to the bracket comprising a central post, flanged members at the ends thereof to rigidly secure the bracket, post and fender together, and means to force said flanged members toward each other.

HARRY CAPLAN.